United States Patent [19]
Barnard et al.

[11] 3,719,041
[45] March 6, 1973

[54] TEMPERATURE-RESPONSIVE CONTROL FOR GAS TURBINE ENGINES

[75] Inventors: Mark Gary Sedgwick Barnard, Kenilworth; Leslie Airey, Farnborough, both of England

[73] Assignee: The Secretary of State For Defence, London and Leyland Gas Turbines Limited, Solihull, both of England

[22] Filed: Feb. 5, 1971

[21] Appl. No.: 112,885

[52] U.S. Cl. ..................60/39.25, 92/62, 415/78
[51] Int. Cl. ...................................F02c 9/00
[58] Field of Search........60/39.25, 39.16 R; 92/13.1, 92/13.2, 62; 415/78

[56] References Cited

UNITED STATES PATENTS

| | | | |
|---|---|---|---|
| 1,926,076 | 9/1933 | Whalen | 92/62 |
| 3,055,177 | 9/1962 | Liston | 60/39.25 |
| 3,252,686 | 5/1966 | Chadwick | 60/39.25 |
| 3,362,156 | 1/1968 | McLean | 60/39.25 |

Primary Examiner—Douglas Hart
Attorney—Holcombe, Wetherill & Brisebois

[57] ABSTRACT

A two-shaft gas turbine engine having variable-area nozzles and a power-operated nozzle-actuating mechanism the rate of movement of which is so correlated with the operation of feedback control means, activated by an error signal derived from the difference between the engine operating temperature and a preset datum, that the time needed for completion of a movement of the nozzles sufficient to produce a significant increase in the operating temperature exceeds the time during which the feedback control means is in operation.

The nozzle actuating mechanism comprises a cylinder containing a primary piston connected to the nozzles, a movable stop, and a free piston between the primary piston and the stop. A motor activated by the feedback control means regulates the position of the stop.

6 Claims, 1 Drawing Figure

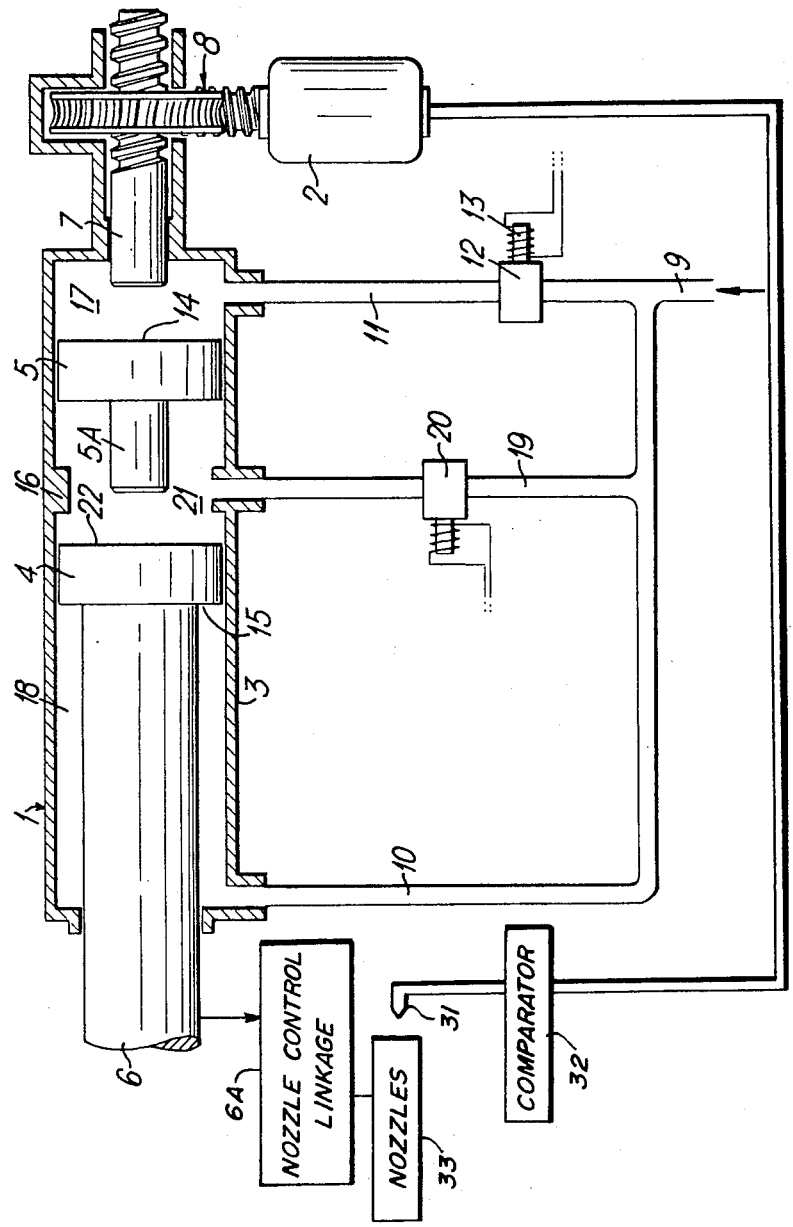

TEMPERATURE-RESPONSIVE CONTROL FOR GAS TURBINE ENGINES

This invention relates to two-shaft gas turbine engines of the type in which the power turbine has variable-area nozzles. These nozzles, which are formed by variable-angle stator vanes, enable the effective discharge area to be varied (in order to effect a desired change in the operating temperature of the engine) by altering the thermodynamic matching of the two shaft assemblies. Such alteration triggers off a sequence of events and results in a change of fuel flow, and hence a change of engine temperature. A signal derived from a temperature sensor is used to initiate and arrest the regulating movement of the nozzles.

The existing practice with gas turbine engines of the above-mentioned type is that, when the operating temperature of the engine is below a preset datum, an error signal is generated which initiates and sustains angular movement of the nozzles such that their effective discharge area is reduced. As a result the operating temperature is increased. The movement of the nozzles continues until the operating temperature reaches the datum temperature and the error signal ceases. A delay is involved in the completion of the sequence and resultant feedback, due to the thermal response of the engine and fuel system, the sensitivity of the thermocouples and the response of the nozzle actuator. This delay can cause overshoot of temperature, and unstable operation. The usual method of preventing this effect is to provide an anticipatory feedback control, independent of temperature error, such control being bases on the rate of change of temperature, or the linear movement of the nozzles, or some other factor. A much simpler method is afforded by the present invention.

According to this invention a two-shaft gas turbine engine of the type specified has power-operated nozzle-actuating mechanism the rate of movement of which is so correlated with the operation of feedback control means, activated by an error signal derived from the difference between the engine operating temperature and a preset datum, that the time needed for completion of a movement of the nozzles sufficient to produce a significant increase in the operating temperature exceeds the time during which the feedback control means is in operation. Consequently, the relationship thus established between the rate of movement of the nozzle-actuating mechanism and the overall response rate is such that stable operation is achieved, and excessively high operating temperatures are avoided. A given movement of the nozzle-actuating mechanism represents a given change in the steady-state operating temperature. By arranging matters so that the time taken to complete the movement which creates a significant temperature increase is longer than the feedback time, the control is rendered stable and excessively high operating temperatures are avoided.

If the operating temperature suddenly increases above the datum temperature, rapid response is required from the nozzles even though this may result in instability and an excessively low operating temperature. Therefore, the invention includes, as a subsidiary feature, means for varying automatically the speed of operation of the nozzle-actuating mechanism in conformity with the extent to which the operating temperature is either too high or too low.

A specific embodiment of the invention, for application to road vehicles powered by a two-shaft gas turbine engine of the type specified above, will now be exemplified with reference to the accompanying schematic drawing.

A nozzle-actuating mechanism 1 is motivated by an electric motor 2 which is controlled by a signal derived from a thermocouple 31 sensing the engine operating temperature. The signal passes through an electronic comparator 32 (of known design) which develops either a positive or a negative voltage, dependent upon whether the thermocouple senses a temperature above or below a preset datum. A negative voltage results in the motor 2 rotating in a direction which causes the nozzle-actuating mechanism 1 to constrict the nozzles 33, whereas a positive voltage has the opposite effect and induces enlargement of the nozzles. Constricting the nozzles increases the engine operating temperature, and enlarging them reduces that temperature.

The comparator operates in such a manner that a negative temperature error causes the motor 2 to be driven slowly in a direction which results in increasing the operating temperature; and a positive temperature error causes the motor to be driven more rapidly in the opposite direction to engender reduction of the operating temperature.

What has so far been described pertains to the steady-state condition.

The nozzle-actuating mechanism 1 comprises a pneumatic servo, the cylinder 3 of which contains two pistons 4 and 5 which will be designated the primary piston and the control piston respectively. The primary piston 4 is coupled, through a large-diameter piston rod 6 and a mechanical linkage (indicated diagrammatically at 6A), to the movable nozzle vanes (not shown). The control piston 5 is a stepped free piston, and is located between the primary piston 4 and a movable power trim stop 7 which is operated by the electric motor 2 through reduction gearing 8. In the steady-state condition the two pistons 4 and 5 are held in contact with the power trim stop 7 by air-pressure supplied to that end of the servo cylinder 3 in which the rod 6 of the primary piston 4 is located. Consequently, any movement of the power trim stop 7 is transmitted directly to the linkage associated with the nozzle vanes.

Through a main air-supply line 9 and its branch 10, air-pressure is supplied at all times to the end of the servo cylinder 3 in which the rod 6 of the primary piston 4 is located. Air-pressure is also supplied through a line 11 to the opposite end of that cylinder (i.e. the end which adjoins the power trim stop 7), except when a solenoid-operated valve 12 in the supply line 11 is energized to shut (this valve being open when its solenoid 13 is de-energized). The area of the face 14 of the control piston 5 adjacent to the power trim stop 7 being larger than the area of the face 15 of the primary piston 4 adjacent to its piston rod 6, the control piston 5 will move away from the power trim stop 7 under the influence of the differential pressure. The nozzles will then be in the idle position, which is defined by a fixed stop 16 located between the two pistons 4 and 5 and which limits the travel of the control piston 5 in the direction towards the primary piston 4.

The solenoid valve 12 is energized to shut when the speed of the gas generator shaft is the same as that demanded by the existing setting of the vehicle's accelerator pedal. When the valve 12 is shut, the space 17 between the control piston 5 and the power trim stop 7 is vented to atmosphere. The air-pressure in the space 18 surrounding the piston rod 6 of the primary piston 4 moves this piston, and the control piston 5, and causes the latter to resume contact with the power trim stop 7.

Through a branch line 19 there is a third supply of air-pressure to the servo cylinder 3, controlled by a solenoid-operated valve 20. When this valve is energized to open, air-pressure is supplied to the space 21 between the two pistons 4 and 5. The area of the face 22 of the primary piston 4 adjacent to the control piston 5 being larger than the area of the other face 15 of the primary piston, admission of air-pressure to the space 21 between the pistons will move the primary piston 4 away from the control piston 5. This will result in the nozzles being moved to a reverse position.

During a deceleration, the control piston 5 is moved away from the power trim stop 7 by a differential speed signal, which de-energizes the 'power' solenoid valve 12; and the primary piston 4 may also be moved away from the control piston 5 if the 'reverse' solenoid valve 20 is energized. The nozzles are then moved to the idle or to the reverse position, dependent on the degree of deceleration required. When the deceleration is complete, the primary piston 4 returns to contact the control piston 5 (which has an axial stub 5A) and both pistons return until the control piston 5 reaches the power trim stop 7, which is still in the high-power position. The temperature will be below the datum temperature, and a low voltage will be fed to the power trim motor 2 which slowly induces constriction of the nozzles to increase the matching temperature. The slow movement of the nozzles enables the feedback signal to follow the movement closely and hence prevent the possibility of temperature overshoot.

During acceleration, the control piston 5 is moved away from the power trim stop 7 by a differential speed signal. Consequently the primary piston 4 and the nozzles are moved to the idle position, which reduces the matching temperature of the engine. However, the excess fuel delivery occasioned by the depressed accelerator pedal increases the actual temperature. The resultant temperature, being above the datum temperature, causes a high voltage to be supplied to the power trim motor 2, which rapidly moves the power trim stop 7 towards the high-power position. This movement continues until either a limit switch (not shown) is reached, which stalls the motor 2 in the case of a full engine acceleration, or the required acceleration has been completed and the temperature drops to the datum temperature, whereupon the power trim motor 2 becomes de-energized. Thus, when the acceleration phase is complete and the control piston 5 returns to the power trim stop 7, this stop will be in approximately the correct position, so precluding the occurrence of excessively high temperatures.

In this example the rate of movement of the power trim motor 2 is determined by the voltage fed to it. The difference between the actual temperature at the control point and the datum temperature, i.e., the temperature error, is used to supply this voltage. A positive error engenders a high voltage, and a negative error a low voltage.

We claim:

1. In a two-shaft gas turbine engine having variable area nozzles and a power-operated nozzle actuating mechanism, the improvement which comprises feedback control means activated by an error signal derived from the difference between the engine operating temperature and a preset datum, said control means being connected to adjust said actuating mechanism so slowly in response to a decrease in said operating temperature below said datum temperature that the time needed for completion of a movement of the nozzles sufficient to produce a significant increase in said engine operating temperature exceeds the time required for said feedback control means to respond to a change in said operating temperature.

2. An engine as claimed in claim 1 in which said nozzle-actuating mechanism comprises an electric motor activated by said error signal and a pneumatic servo having a cylinder containing a primary piston, a stepped free piston, said primary piston being coupled through a large diameter piston rod to said variable-area nozzles, and a movable power trim stop connected to be operated by said motor said free piston being located between said primary piston and said stop.

3. An engine as claimed in claim 2 comprising fluid pressure means which constantly supplies fluid pressure to the end of the servo cylinder in which said piston rod is located so as to urge said primary piston against said free piston and said free piston against said stop during the steady-state condition.

4. An engine as claimed in claim 3 comprising means for supplying fluid pressure to the end of said cylinder between said stop and free piston and means responsive to a differential speed signal and comprising a solenoid operated valve for closing off said last mentioned fluid supplying means and venting said last mentioned cylinder end to atmosphere.

5. An engine as claimed in claim 4 comprising a fluid supply line leading to said cylinder between said pistons and a solenoid operated valve for closing said line, said primary piston being so coupled to said nozzles that said nozzles are moved to their reverse position when fluid is introduced into said cylinder through said line between said pistons to force them apart.

6. An engine as claimed in claim 1 in which said control means is connected to adjust said actuating mechanism more rapidly when said operating temperature is above said datum temperature than when it is below that temperature.

* * * * *

UNITED STATES PATENT OFFICE
CERTIFICATE OF CORRECTION

Patent No. 3,719,041   Dated March 6, 1973

Inventor(s) MARK CARY SEDGWICK BARNARD & LESLIE AIREY

It is certified that error appears in the above-identified patent and that said Letters Patent are hereby corrected as shown below:

[75] Inventors: Mark Cary Sedgwick Barnard, Kenilworth, Leslie Airey, Farnborough, both of England

[30]   Foreign Application Priority Data

February 18, 1970   Great Britain ... 7680/70

Signed and sealed this 10th day of July 1973.

(SEAL)
Attest:

EDWARD M. FLETCHER, JR.                Rene Tegtmeyer
Attesting Officer                      Acting Commissioner of Patents